United States Patent [19]

Takahashi et al.

[11] Patent Number: 5,210,849
[45] Date of Patent: May 11, 1993

[54] CACHE MEMORY SIMULTANEOUSLY UPDATING FOR A MISS AND DECIDING ON HIT OR MISS OF NEXT ADDRESS

[75] Inventors: Kazunori Takahashi, Neyagawa; Tokuzo Kiyohara, Osaka, both of Japan

[73] Assignee: Matsushita Electric Industrial Co., Ltd., Kadoma, Japan

[21] Appl. No.: 539,910

[22] Filed: Jun. 18, 1990

[30] Foreign Application Priority Data

Jun. 20, 1989 [JP] Japan .................. 1-157787

[51] Int. Cl.⁵ .................. G06F 9/32; G06F 12/00
[52] U.S. Cl. .................. 395/425; 364/DIG. 2; 364/948.3; 364/955.0; 364/955.1; 364/956.1; 364/957.9; 364/957.6; 364/958.3; 364/962.1; 364/964.2; 364/964.21; 364/964.24; 364/964.25; 364/964.34; 364/965.4
[58] Field of Search .................. 364/200, 900, DIG. 1, 364/DIG. 2; 395/425, 400

[56] References Cited

U.S. PATENT DOCUMENTS

| | | | |
|---|---|---|---|
| 4,228,503 | 10/1980 | Waite et al. | 395/425 |
| 4,768,148 | 8/1988 | Keeley et al. | 395/425 |
| 4,851,993 | 7/1989 | Chen et al. | 395/250 |
| 4,905,141 | 2/1990 | Brenza | 395/425 |
| 4,928,239 | 5/1990 | Baum et al. | 395/425 |
| 4,953,073 | 8/1990 | Moussouris et al. | 395/400 |
| 4,954,944 | 9/1990 | Ikeda | 395/400 |
| 5,014,240 | 5/1991 | Suzuki et al. | 395/425 |
| 5,019,971 | 5/1991 | Lefsky et al. | 395/425 |
| 5,032,985 | 7/1991 | Curran et al. | 395/425 |
| 5,056,002 | 10/1991 | Watanabe | 395/425 |
| 5,070,444 | 12/1991 | Kubo et al. | 395/425 |
| 5,097,409 | 3/1992 | Schwartz et al. | 395/425 |
| 5,097,414 | 3/1992 | Tone | 395/425 |
| 5,109,498 | 4/1992 | Kamiy et al. | 395/425 |

Primary Examiner—Michael R. Fleming
Assistant Examiner—Ayaz R. Sheikh
Attorney, Agent, or Firm—Spencer, Frank & Schneider

[57] ABSTRACT

In a cache memory simultaneously conducting updating for a miss and a decision on a miss for the subsequent address, a write flag generated by a control unit is written in a valid flag field. Based on this operation, during an access to an external memory at an occurrence of a miss, a tag field and the valid flag field are simultaneously updated. When updating a data field, a read operation is achieved on the tag and valid flag fields to decide occurrence of miss. Thus, an external memory access for a miss at a next address can be executed at an earlier point of time. Moreover, by the provision of a data latch disposed for an output from the data field, and by reading data at a next address and keeping it in the data latch during a memory read cycle, succeeding hit data can be outputted immediately after a miss processing is completed. Furthermore, also in a cache memory having a plurality of tag fields and a plurality of valid flag fields, the updating for a miss and the decision on a miss for a next address can be attained at the same time.

3 Claims, 11 Drawing Sheets

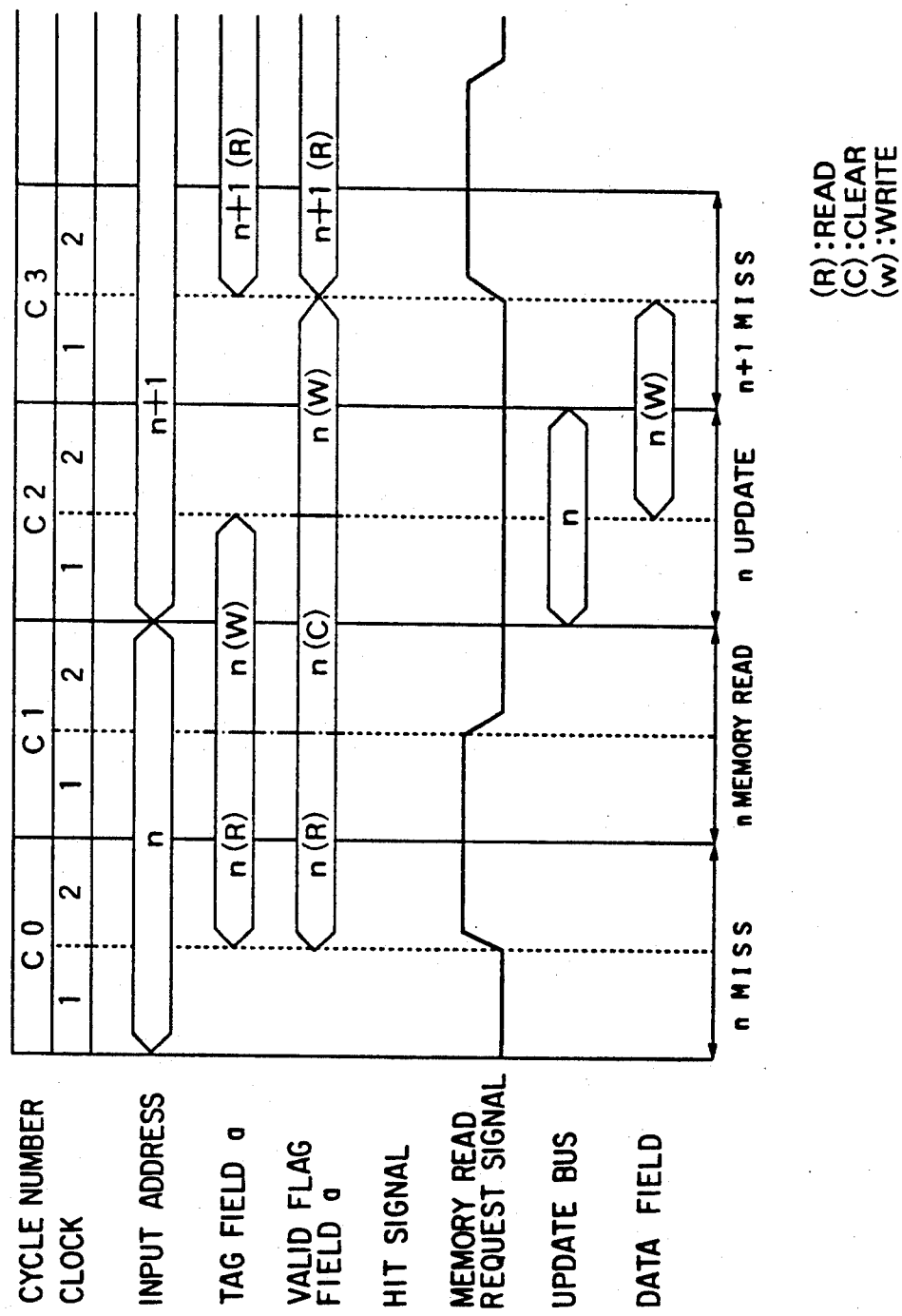

CACHE MEMORY SIMULTANEOUSLY UPDATING FOR A MISS AND DECIDING ON HIT OR MISS OF NEXT ADDRESS

BACKGROUND OF THE INVENTION

1. Field of the Invention

The present invention relates to a cache memory employed as a high-speed local memory of a microprocessor.

2. Description of the Related Art

FIG. 10 shows the constitution of a conventional cache memory, which is an example of an instruction cache memory of a direct map system to be used in an instruction fetch operation of a microprocessor. The configuration of FIG. 10 comprises an input address 1, an address latch 2 for storing therein a low-order portion of the input address, an input address low-order portion 3, an address latch low-order portion 4, a data address selector 5 for selecting between the input address low-order portion 3 and the address latch low-order portion 4, a tag field a 6a, a comparator 7 for comparing a high-order portion of the input address with an address read from the tag field a 6a, a data field 8, a valid flag field a 9a for storing therein a valid flag designating validity of data in the data field 8, a read flag 10 obtained from the valid flag field a 9a, an update bus 11 for transferring therethrough update data of the data field 8, a data selector 12 for selecting between data read from the tag field a 6a and data from the update bus 11, output data 13, a hit signal 14 created from a signal from the comparator 7 and the read flag 10, a memory read request signal 16 to be supplied at a miss occurrence to a memory at another hierarchical level (to be simply referred to as a memory hereinbelow), a memory read acknowledge signal 17 delivered from the memory in response to the memory read request signal 16, and control means 18 for outputting the memory read request signal 16 to the memory and for receiving the memory read acknowledge signal therefrom.

Next, a description will be given of the operation of the conventional cache memory example thus configured.

FIG. 11 is a signal timing chart in the prior art memory. Referring now to this chart, the operation will be described in the operation order (in the cycle number order of C0 to C3).

C0 CYCLE

An address n for a retrieval is loaded in the input address. Based on the low-order portion (entry address) of the input address 1, read operations are achieved on the tag field a 6a and the valid flag field a 9a. The address read from the tag field a 6a is compared with the high-order portion (tag data) of the input address 1 in the comparator 7. Based on a result of the comparison from the comparator 7 and data from the valid flag field a 9a, a hit signal is produced. In the cycle C0, the tags do not match each other and hence a miss is assumed. The control means 18 then generates a memory read request signal 16 to send a read request to a memory.

C1 CYCLE

On receiving a memory read acknowledge signal 17 from the memory, the control means 18 recognizes that an access to the memory has been started (C1 is assigned as a memory read cycle) and thereafter performs the following operations.

Load the address latch 2 with the content of the input address 1 in the preceding cycle.

Update tag data of the tag field a 6a for the entry address.

Clear the flag in the valid flag field a 9a for the entry address (all bits associated with the entry).

C2 CYCLE

Data from the memory is delivered to the update bus 11 and then the data of the data field 8 is updated in association with the entry address (the address latch low-order portion 4 is selected by the data address selector 5). At the same time, a flag (one bit) is set in the valid flag field a 9a for the entry address. At this point, the data selector 12 selects the update bus 11 to deliver data thereon as the output data 13.

C3 CYCLE

The input address 1 is beforehand loaded with an address n+2 and hence the system reads data from the tag field a 6a and the valid flag field a 9a by using the address n+2, which results in a miss. The control means 18 creates a memory read request signal 16 to send a read request to the memory.

However, with the constitution above, at an occurrence of a miss in the cache memory, the next address retrieval is kept in a wait state until the cache memory update operation is completed. Namely, at a miss in the cache memory, the next address retrieval is possible only when data is read from a memory at another hierarchical level and then the cache memory is updated accordingly. This leads to a problem of a considerable overhead in association with the miss of the cache memory. Incidentally, by adopting a two-port memory as the cache memory, the update and the retrieval of the content of the cache memory, that is, the cache memory read and write operations can be simultaneously performed. However, there arises another problem in this case that such a configuration requires an increased area or space and hence cannot be adopted as a local memory of a microprocessor.

SUMMARY OF THE INVENTION

The present invention is directed to solving the foregoing problems.

An object of a first embodiment of the invention is to provide a cache memory in which, without necessitating any change in the constitution of the cache memory, updating associated with a miss and a decision on a miss related to a subsequent address are carried out at the same time.

In order to achieve the above object, the cache memory according to the first embodiment of the present invention includes a tag field which is accessed for a read operation by using a low-order portion of an address and which stores therein a high-order portion of the address, a data field for storing therein data associated with an address, a valid flag field for storing therein a valid flag of data associated with an address, hit decision means for receiving as inputs thereto an address read from the tag field, the high-order portion of the address, and a valid flag obtained from the valid flag field and for deciding an occurrence of a hit or miss, and control means for generating a write flag for the valid flag field. With this configuration, in a write operation of the tag field, the write flag produced by the control means is written in the valid flag field, thereby judging an occurrence of a miss of a subsequent address when updating for a miss is conducted.

An object of a second embodiment of the present invention is to provide a cache memory in which, without changing the constitution of the cache memory, updating for a miss and a decision on a miss of a next address can be simultaneously achieved, and furthermore an overhead associated with a hit operation after the occurrence of a miss can be reduced.

To achieve the above object, the cache memory according to the second embodiment of the invention comprises a tag field which is accessed for a read operation by using lower-order portion of an address and which stores therein a high-order portion of the address, a data field for storing therein data associated with an address, a valid flag field for storing therein a valid flag of data associated with an address, hit decision means for receiving as inputs thereto an address read from the tag field, the high-order portion of the address, and a valid flag obtained rom the valid flag field and for deciding an occurrence of a hit or miss, control means for generating a write flag for the valid flag field, and a data latch for storing therein an output of the data field. With the above configuration, in a write operation of the tag field, the write flag produced by the control means is written in the valid flag field so that an occurrence of a miss of a subsequent address is judged when updating for a miss is conducted. Moreover, since data for a high has been beforehand kept in the data latch, the hit data can be outputted immediately after the processing of a miss is completed.

An object of a third present invention is to provide a cache memory in which, when different valid flag fields are employed in a successive fashion, updating for a miss and a decision on a miss of a next address can be simultaneously achieved.

To achieve the above object, the cache memory according to the third embodiment of the invention comprises a tag field which is accessed for a read operation by using a low-order portion of an address and which stores therein a high-order portion of the address, a data field for storing therein data associated with an address, a plurality of valid flag fields each for storing therein a valid flag of data associated with an address, and hit decision means for receiving as inputs thereto an address read from the tag field, the high-order portion of the address, and a valid flag obtained from the valid flag field and for deciding an occurrence of a hit or miss. With this configuration, when conducting updating for a miss, a valid flag is read from another valid flag field not updated before, thereby deciding an occurrence of a miss of a subsequent address when updating for a miss is conducted.

It is an object of a fourth embodiment of the present invention to provide a cache memory in which, when different valid flag fields are employed in a successive fashion, updating for a miss and a decision on a miss of a next address are simultaneously achieved and in which an overhead for a hit operation after the occurrence of a miss can be reduced.

In order to achieve the above object, the cache memory according to the fourth embodiment of the invention comprises a tag field which is accessed for a read operation by using a low-order portion of an address and which stores therein a high-order portion of the address, a data field for storing therein data associated with an address, a plurality of valid flag fields each for storing therein a valid flag of data associated with an address, hit decision means for receiving as inputs thereto an address read from the tag field, the high-order portion of the address, and a valid flag obtained from the valid flag field and for deciding an occurrence of a hit or miss, and a data latch for storing therein an output of the data field. With this configuration, when conducting updating for a miss, a valid flag is read from another valid flag field not updated before to thereby decide on a miss of a subsequent address when updating for a miss is conducted. Furthermore, since data associated with a hit is stored beforehand in the data latch, data, for which a hit has occurred after the processing of a miss, can be outputted immediately.

An object of a fifth embodiment of the present invention is to provide a cache memory in which, when different valid flag field and tag fields are employed in a successive fashion, updating for a miss and a decision on a miss of a next address are simultaneously achieved, thereby making it possible to detect successive misses even when misses occur successively.

In order to achieve the above object, the cache memory according to the fifth embodiment of the invention comprises a plurality of tag fields each of which is accessed for a read operation by using a low-order portion of an address and stores therein a high-order portion of the address, a data field for storing therein data associated with an address, a plurality of valid flag fields each for storing therein a valid flag of data associated with an address, hit decision means for receiving as inputs thereto an address read from the tag field, the high-order portion of the address, and a valid flag obtained from the valid flag field and for deciding an occurrence of a hit or miss, and control means for generating a write flag for a valid flag field. With this configuration, while a write operation in a tag field and a write operation, in a valid flag field, of a write flag produced by the control means are conducted, a read operation for a subsequent address from another tag field and another valid flag field is conducted, thereby deciding an occurrence of a hit or miss.

An object of a sixth embodiment of the present invention is to provide a cache memory in which, when different valid flag fields are employed in a successive fashion, updating for a miss and a decision on a miss of a next address are simultaneously achieved, thereby successively detecting misses even when the misses occur successively and reducing n overhead for a hit operation after a miss has occurred.

In order to achieve the above object, the cache memory according to the sixth embodiment of the invention comprises a plurality of tag fields each of which is accessed for a read operation by using a low-order portion of an address and stores therein a high-order portion of the address, a data field for storing therein data associated with an address, a plurality of valid flag fields each for storing therein a valid flag of data associated with an address, hit decision means for receiving as inputs thereto an address read from the tag field, the high-order portion of the address, and a valid flag obtained from the valid flag field and for deciding an occurrence of a hit or miss, control means for generating a write flag for a valid flag field, and a data latch for storing therein an output of the data field. With this construction, while a write operation in a tag field and a write operation, in a valid flag field, of a write flag produced by the control means are conducted, a read operation for a subsequent address from another tag field and another valid flag field is conducted, thereby deciding an occurrence of a hit or miss. Further, since data associated with a hit is stored beforehand in the data latch, data, for which a hit has occurred after the processing of a miss, can be outputted immediately.

BRIEF DESCRIPTION OF THE DRAWINGS

These and other objects and advantages of the present invention will become apparent by the following description and accompanying drawings, wherein

FIG. 11 is an operation timing chart of the conventional cache memory.

DESCRIPTION OF THE PREFERRED EMBODIMENTS

Figure 1:
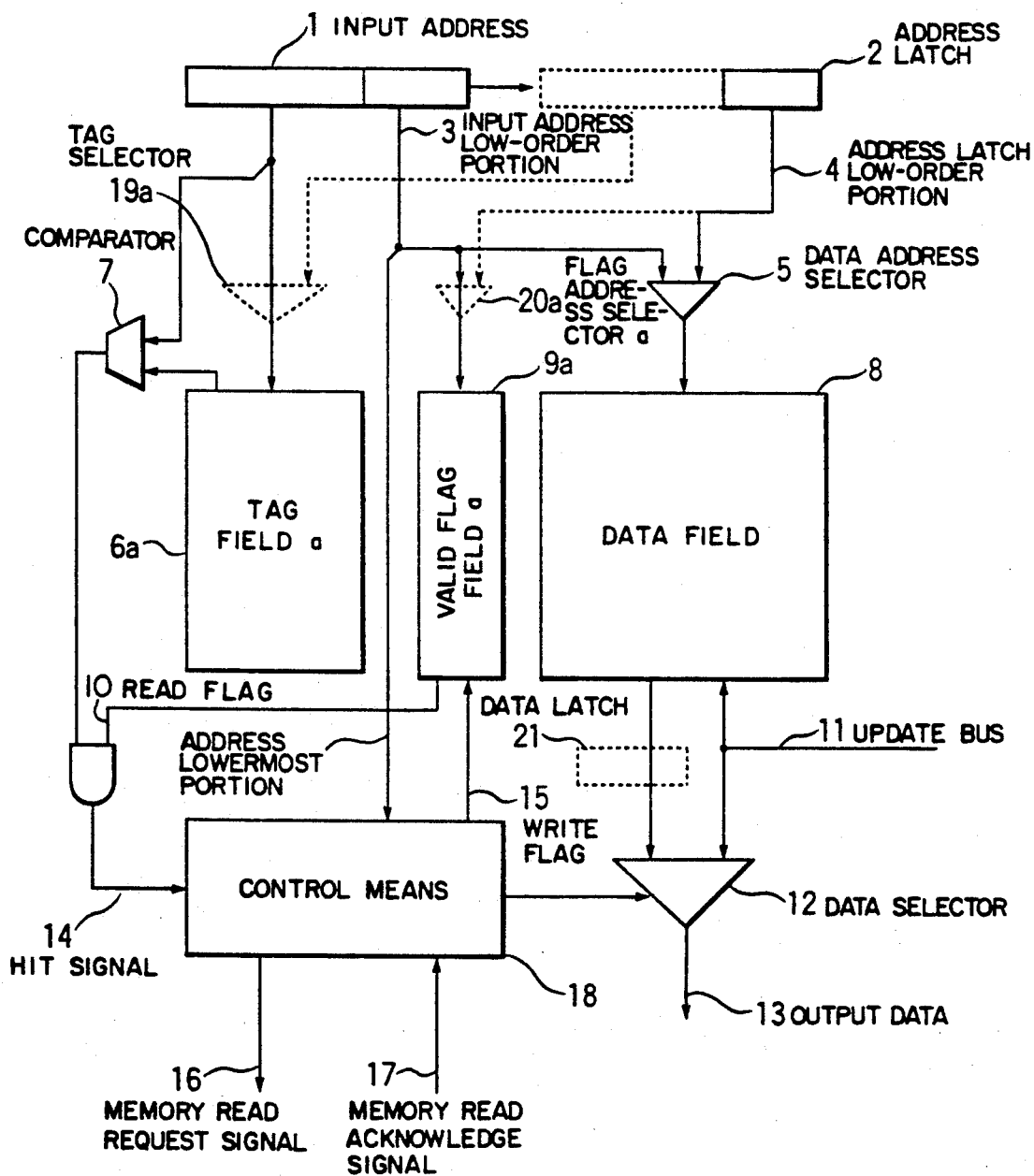
FIG. 1 is a schematic diagram showing the configuration of a cache memory according to first and second embodiments of the present invention.

FIG. 1 shows a configuration diagram of a cache memory of a first embodiment according to the present invention. This configuration is an example of an instruction cache memory of a direct map system (with four words assigned to each entry) used in an instruction fetch mechanism of a microprocessor. In the configuration of FIG. 1, there are shown an input address 1, an address latch 2 for storing therein a low-order portion of the input address, an input address low-order portion 3, an address latch low-order portion 4, a data address selector 5 for conducting a selection between the input address low-order portion 3 and the address latch low-order portion 4, a tag field a 6a, a comparator 7 for comparing a high-order portion of the input address 1 with an address attained from the tag field a 6a, a data field 8, a valid flag field a 9a for storing therein a valid flag designating validity of data obtained from the data field 8, a read flag 10 read from the valid flag field a 9a, an update bus 11 for transferring therethrough update data of the data field 8, a data selector 12 for performing selection between data supplied from the tag field a 6a and data sent via the update bus 11, output data 13, a hit signal 14 created based on a signal from the comparator 7 and the read flag 10, a write flag 15 for the valid flag field a 9a, a memory read request signal 16 delivered to a memory at a miss occurrence, a memory read acknowledge signal 17 sent from the memory in response to the memory read request signal, and control means 18 which outputs the memory read request signal 16 to the memory, receives the memory read acknowledge signal 17 from the memory, and produces a write flag 15 based on a low-order portion (including two bits) of the input address 1.

A description will now be given of the operation of the embodiment thus configured.

Figure 2:
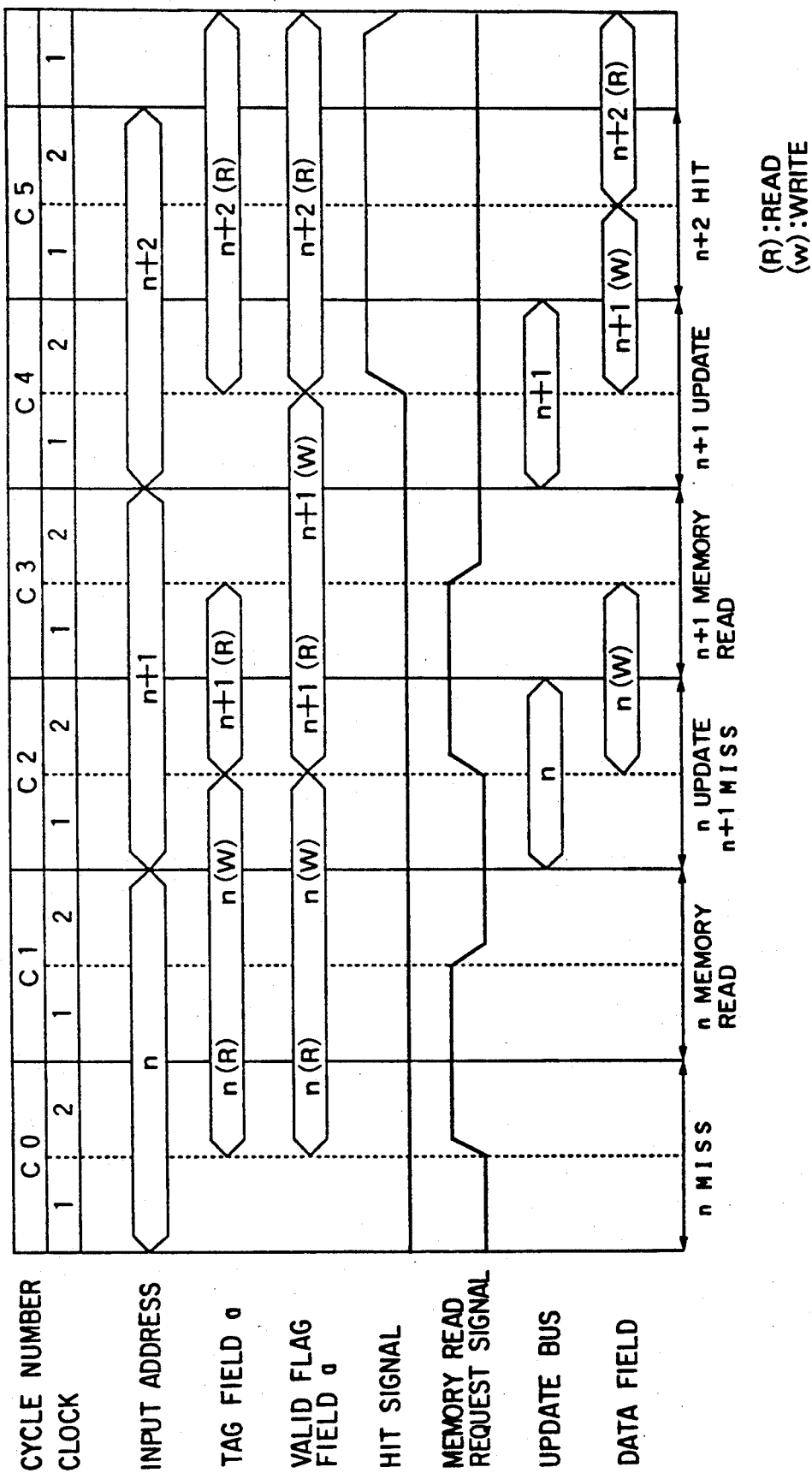
FIG. 2 is an operation timing chart of the cache memory of the first embodiment of the present invention.

Referring to FIG. 2, which is a signal timing chart of the embodiment, the operation will be described in the operation sequence (of the cycle numbers C0 to C5).

C0 CYCLE

An address n for a retrieval is fed from the input address 1. Based on the low-order portion (an entry address) of the input address 1, contents of the tag field a 6a and the valid flag field a 9a are obtained from the respective fields. The comparator 7 compares the resultant address and the upper-portion (tag data) of the input address. Depending on a result of the comparison and the read flag 10, a hit signal 14 is produced. In this case, the tags do not match each other and hence a miss occurs. The control means 18 therefore generates a memory read request signal 16 to issue a read request to the memory.

C1 CYCLE

The memory returns a memory read acknowledge signal 17 to the control means 18, which in turn confirms that an access to the memory has been started (C1 indicates a memory read cycle) and then conducts the following operations.

Store the low-order portion of the input address 1 of the previous cycle in the address latch 2.

Update tag data of the tag field a 6a for the entry address.

Update a flag (including four bits) of the valid flag field a 9a for the entry address.

In this embodiment, a four-bit flag is disposed for an entry. Consequently, the control means 18 produces a four-bit write flag 15 for the entry Table 1. The valid flag field a 9a writes the write flag 15 in a four-bit flag associated with the entry address.

TABLE 1

| Write flag generation | |
|---|---|
| Two low-order bits | Write flag |
| 00 | 0001 |
| 01 | 0010 |
| 10 | 0100 |
| 11 | 1000 |

C2 CYCLE

The memory supplies data to the update bus 11 and then data of the data field 8 is updated based on the entry address (the address latch low-order portion 4 is selected by the data address selector 5). At this moment, the data selector 12 selects the update bus 11 to deliver data to the output data 13.

On the other hand, the input address 1 is loaded with an address n+1 so as to read contents from the tag field a 6a and the valid flag field a 9a, thereby determining a miss. In the C2 cycle, although the tags match each other, the valid flag indicates invalidity and hence the miss has occurred.

C3 CYCLE

Like in the C1 cycle, the system conducts in the valid flag field a 9a an update of a flag (including one bit) for the entry address (a write flag 15 is created in accordance with Table 1 to update the one-bit flag associated with the entry address). The tag field a 6a is not updated.

C4 CYCLE

The memory supplies data to the update bus 11 and then data of the data field 8 is updated for the entry address (the address latch low-order portion 4 is selected by the data address selector 5). At this moment, the data selector 12 selects the update bus 11 to deliver data to the output data 13.

On the other hand, the input address 1 is loaded with an address n+2 to read contents from the tag field a 6a and the valid flag field a 9a, which results in a hit. However, the data field 8 is under an update operation and hence is not available for a read operation. In consequence, the data read operation is postponed to be performed in the next cycle. As a result, the input address 1 is kept loaded with the address n+2.

C5 CYCLE

By using the address n+2, contents of the tag a 6a and the valid flag field a 9a are obtained, which results in a hit. Thereafter, the system reads data from the data field 8 at the address n+2 to send the data to the output data 13.

As described above, in accordance with this embodiment, with the provision of the control means producing a write flag, the update for a miss and a judgement of a miss for the subsequent address can be simultaneously accomplished, thereby minimizing the overhead at a miss occurrence.

FIG. 1 is a configuration diagram also showing the constitution of a cache memory of the second embodiment according to the present invention. The cache memory of the second embodiment is implemented by additionally disposing the following constituent elements (indicated by the broken lines) in the first embodiment described above. Namely, the additional elements are an address latch 2 for storing therein the content of the input address 1 in the original data form, a tag selector a 19a for performing selection between the contents respectively of the input address 1 and the address latch 2 and for delivering the selected address to the tag field a 6a, a flag address selector a 20a for conducting a selection between the input address low-order portion 3 and the address latch low-order portion 4 and for outputting an address of a valid flag field a 9a to be accessed, and a data latch 21 for storing therein an output from the data field 8.

Next, a description will be given of the operation of the embodiment thus constituted.

Figure 3:
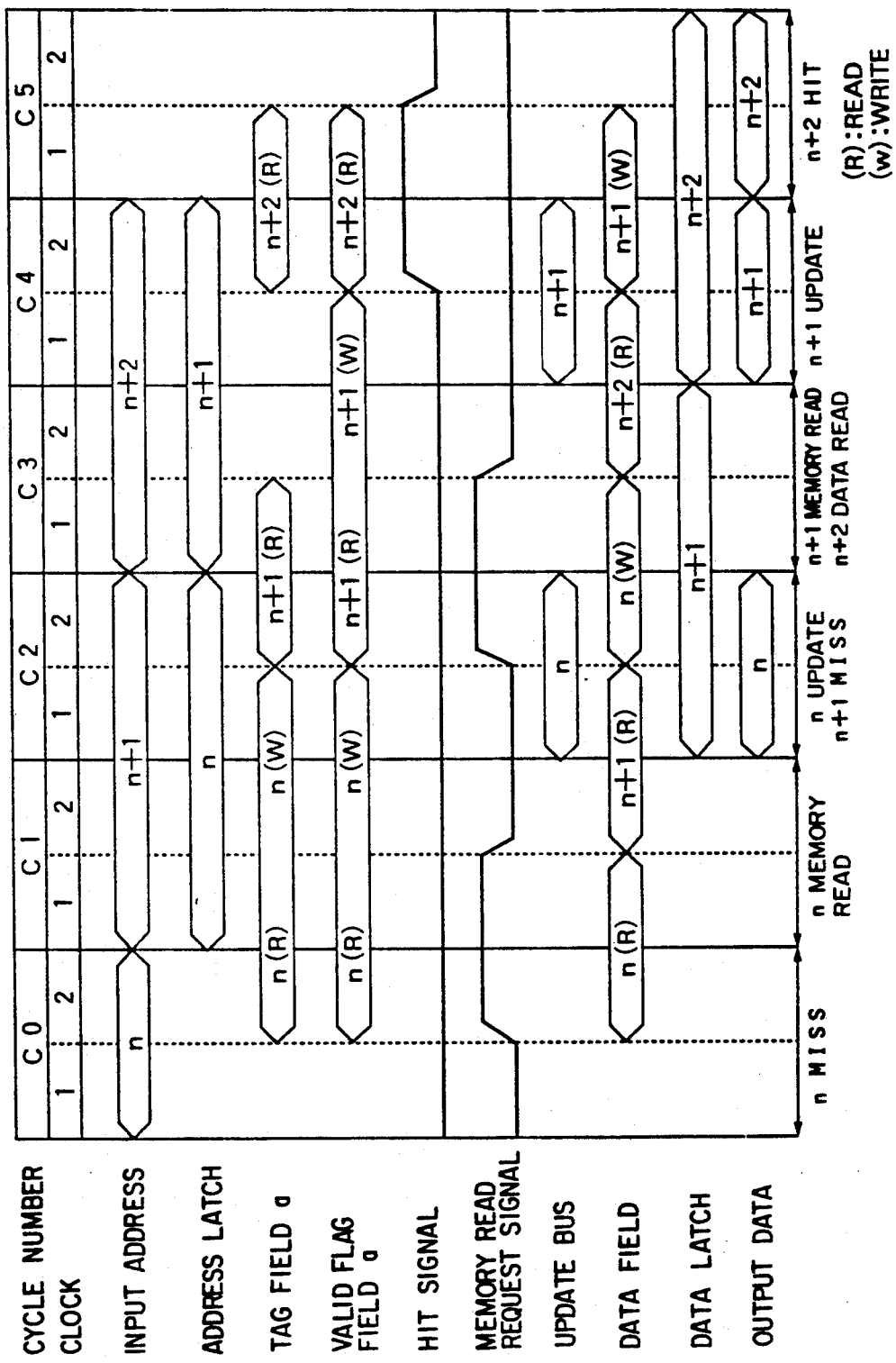
FIG. 3 is an operation timing chart of the cache memory of the second embodiment of the present invention.

FIG. 3 is a signal timing chart of the embodiment. The operation will be described in accordance with the operation sequence (in the cycle number order C0 to C5) of FIG. 3. Since the operation to be carried out at a miss occurrence is similar to that employed in the first embodiment, a detailed description thereof will be avoided.

C0 CYCLE

An attempt is made to retrieve data at an address n, which results in a miss due to mismatching between tags. The control means 18 creates a memory read request signal 16 and issues a memory read request to the memory.

C1 CYCLE

The memory sends in response to the memory read request signal 16 a memory read acknowledge signal 17 to the control means 18, which then confirms an initiation of the memory access (C1 is a memory read cycle) to subsequently perform the following operations.

Update the tag field a 6a and the valid flag field a 9a (as to the address, the content of the address latch 2 is selected in the tag selector a 19a and the flag address selector a 20a).

The input address 1 is loaded with a next address n+1. At the same time, the address latch 2 keeps an address n at the C0 cycle.

The data field 8 is accessed for a read operation at the address n+1. The obtained data is stored in the data latch 21 in the subsequent cycle.

C2 CYCLE

The memory delivers data onto the update bus 11 and then data is updated in the data field B for the entry address (the data address selector 5 selects the address latch low-order portion 4). At this moment, the data selector 12 selects the update bus 11 to feed the data to the output data 13.

On the other hand, the tag field a 6a and the valid flag field a 9a are accessed for a read operation at the address n+1, which results in a miss. In the cycle C2, although the tags match each other, since the valid flag denotes invalidity, the miss has occurred.

C3 CYCLE

The control means 18 confirms the initiation of the memory access (C3 is a memory read cycle). The system subsequently performs the following operations.

Update the valid flag field a 9a (as to the address, the content of the address latch 2 is selected in the flag address selector a 20a).

The input address 1 is loaded with a next address n+2. At the same time, the address latch 2 keeps an address n+2 at the C2 cycle.

The data field 8 is accessed for a read operation at the address n+2. The obtained data is stored in the data latch 21 in the subsequent cycle.

C4 CYCLE

The memory delivers data onto the update bus 11 and then data is updated in the data field 8 for the entry address (the data address selector 5 selects the address latch low-order portion 4). At this moment, the data selector 12 selects the update bus 11 to feed the data to the output data 13.

On the other hand, the tag field a 6a and the valid flag field a 9a are accessed for a read operation at the address n+2, which results in a hit.

C5 CYCLE

In response to the hit decision for the address n+2 in the preceding cycle, the content of the data latch 21 beforehand loaded with data obtained at the address n+2 is selected by the data selector 12. The selected data is immediately delivered to the output data 13.

In consequence, in the case of a hit occurring in the cache after a miss, the data is immediately sent to the output data 13 without any delay.

As described above, in accordance with this embodiment, with the provision of the control means producing a write flag, the update for a miss and a judgement of a miss for the subsequent address can be simultaneously accomplished, thereby minimizing the overhead at a miss occurrence. Furthermore, since a data latch is disposed at an output from the data field so that, during a memory read cycle, data of the next address is read and is kept in the data latch, which reduces the overhead of the hit operation after a miss occurrence.

Figure 4:
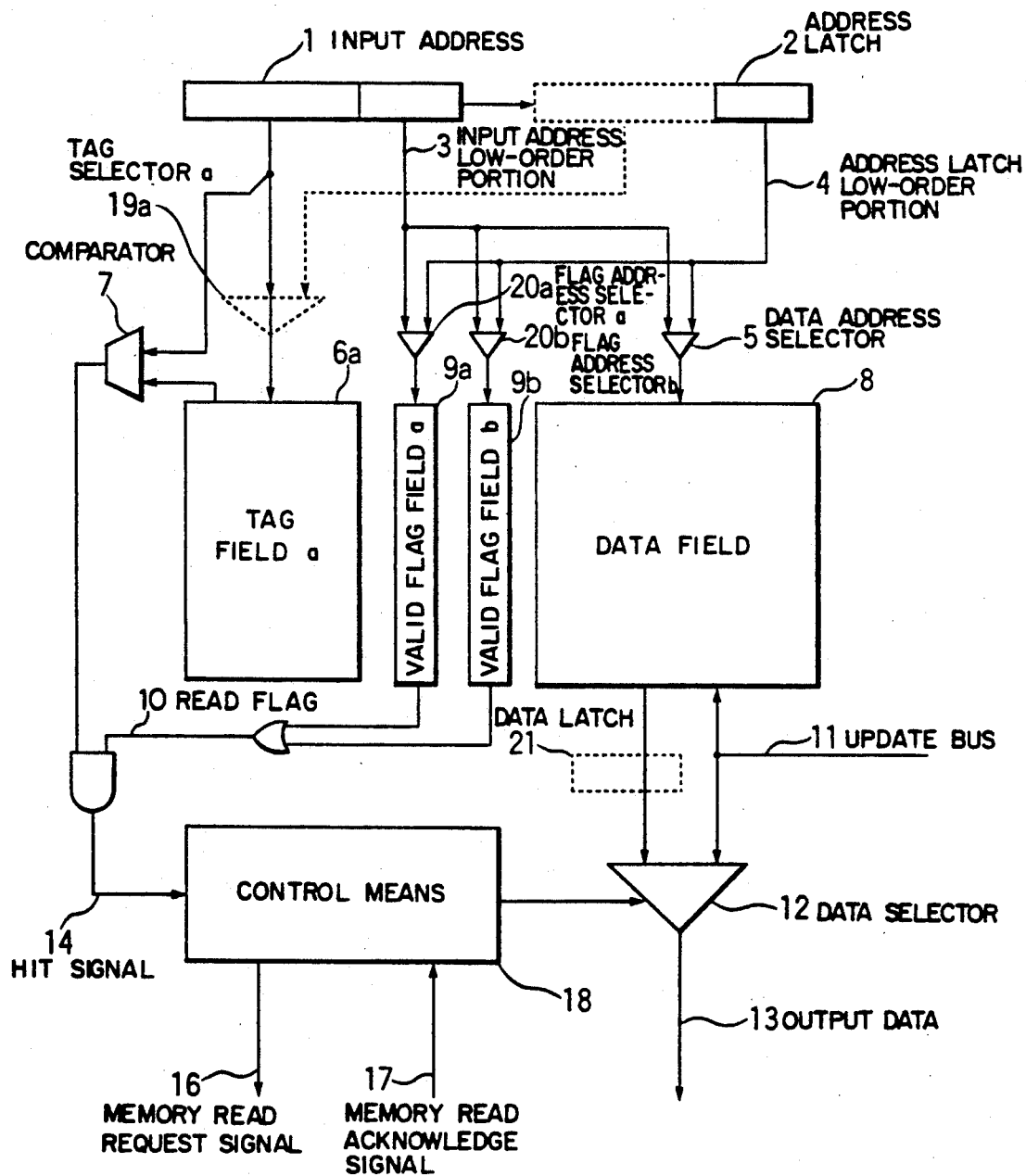
FIG. 4 is a schematic diagram showing the configuration of a cache memory according to third and fourth embodiments of the present invention.

FIG. 4 is a configuration diagram of a cache memory in a third embodiment according to the present invention. This configuration is an example of an instruction cache memory of a direct map system used in an instruction fetch mechanism of a microprocessor. The constitution of FIG. 4 comprises an input address 1, an address latch 2 for storing therein a low-order portion of the input address, an input address low-order portion 3, an address latch low-order portion 4, a data address selector 5 for conducting a selection between the input address low-order portion 3 and the address latch low-order portion 4, a tag field a 6a, a comparator 7 for comparing a high-order portion of the input address 1 with an address read out from the tag field a 6a, a data field 8, valid flag fields a 9a and b 9b each for storing therein a valid flag designating validity of data of the data field 8, flag address selectors a 20a and b 20b for respectively producing addresses for the valid flag fields a 9a and b 9b, a read flag 10, an update bus 11 for transferring therethrough update data of the data field 8, a data selector 12 for performing selection between data supplied from the tag field a 6a and data sent via the update bus 11, output data 13, a hit signal 14 created based on a signal from the comparator 7 and the read flag 10, a memory read request signal 16 delivered to a memory at a miss occurrence, a memory read acknowledge signal 17 sent from the memory in response to the memory read request signal, and control means 18 which outputs the memory read request signal 16 to the memory and which receives the memory read acknowledge signal 17 from the memory.

A description will now be given of the operation of the embodiment configured as above.

In this embodiment, the system is constituted such that when the least significant bit (LSB) is 0 or 1, valid flag field a 9a or b 9b is respectively selected. The microprocessor is associated with a sequence of instructions consecutively arranged. That is, because of a characteristic of this system that the LSB of an address takes a value of 0 or 1 in an alternate manner, and hence the valid flag fields a 9a and b 9b are alternately used, the embodiment operates in an advantageous fashion.

Figure 5:
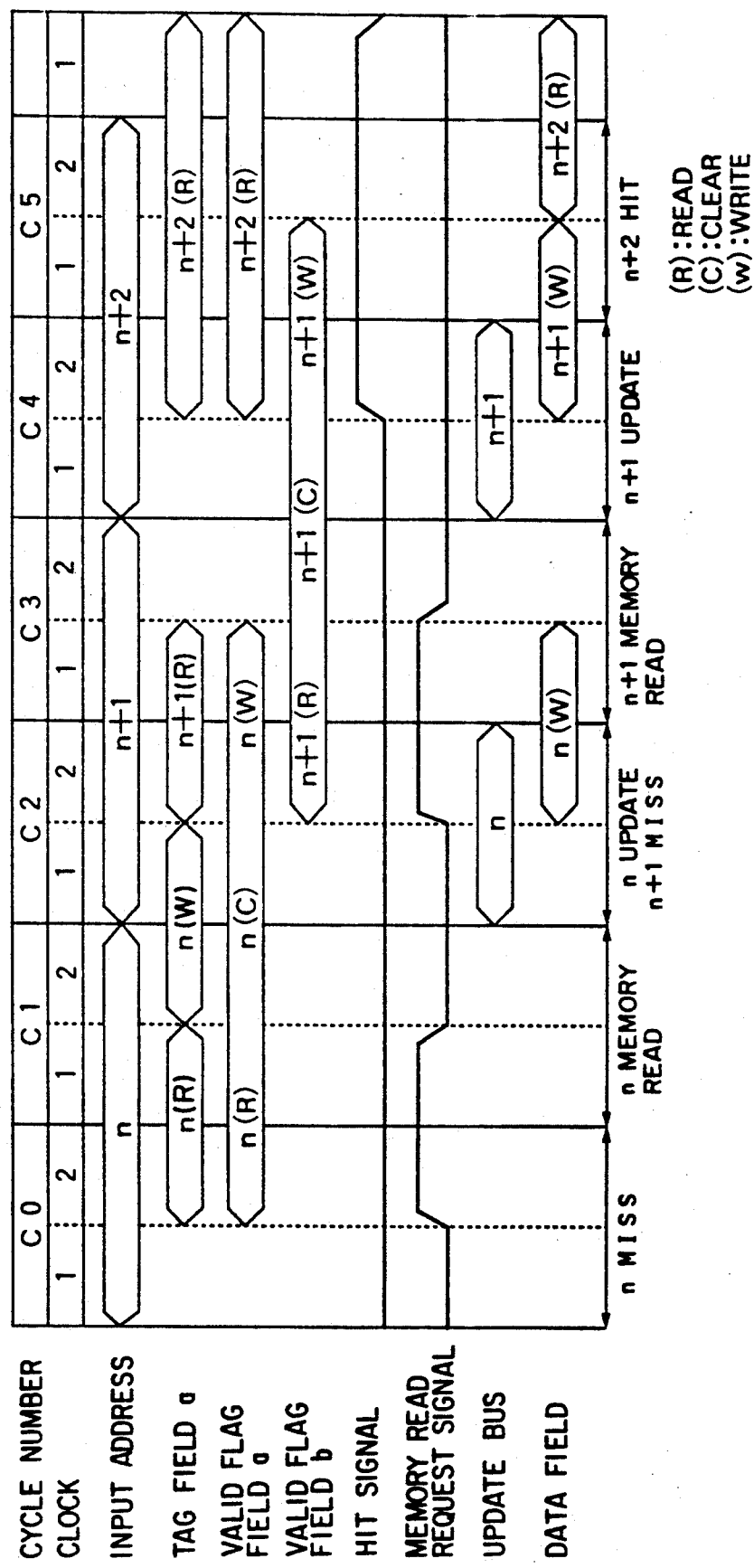
FIG. 5 is an operation timing chart of the cache memory of the third embodiment of the present invention.

Referring to FIG. 5 showing a signal timing chart of the embodiment, the operation will be described in the operation sequence (of the cycle numbers C0 to C5).

C0 CYCLE

An address n (LSB=0) for a retrieval is fed from the input address 1. Based on the low-order portion (an entry address) of the input address 1, contents of the tag field a 6a and the valid flag field a 9a are obtained from the respective fields. The comparator 7 compares the attained address and the upper-portion (tag data) of the input address. Depending on a result of the comparison and a signal associated with a result read from the valid flag field 9a, a hit signal 14 is produced. In the C0 cycle, the tags do not match each other and hence a miss occurs. The control means 18 therefore generates a memory read request signal 16 to issue a read request to the memory.

C1 CYCLE

The memory returns a memory read acknowledge signal 17 to the control means 18, which in turn confirms that an access to the memory has been started (C1 indicates a memory read cycle). The system then conducts the following operations.

Store the content of the input address 1 of the previous cycle in the address latch 2.

Update tag data of the tag field a 6a for the entry address.

Clear a flag (all bits associated with the entry) of the valid flag field a 9a for the entry address.

C2 CYCLE

The memory supplies data to the update bus 11 and then data of the data field 8 is updated based on the entry address (the address latch low-order portion 4 is selected by the data address selector 5). Simultaneously, a flag (comprising one bit) is set for the entry address of the valid flag field a 9a (the address latch low-order portion 4 is selected by the flag address selector a 20a). At this moment, the data selector 12 selects the update bus 11 to deliver data to the output data 13.

On the other hand, the input address 1 is loaded with an address n+1 (LSB=1) so as to read contents from the tag field a 6a and the valid flag field b 9b, thereby deciding on a miss. In the C2 cycle, although the tags match each other, the valid flag indicates invalidity and hence the miss has occurred.

C3 CYCLE

Like in the C1 cycle, the system clears, in the valid flag field b 9b, a flag (including one bit) for the entry address. The tag field a 6a is not updated.

C4 CYCLE

The memory supplies data to the update bus 11 and then data of the data field 8 is updated for the entry address (the address latch low-order portion 4 is selected by the data address selector 5). Simultaneously, a flag (including one bit) is set for the entry address of the valid flag field b 9b (the flag address selector b 20b selects the address latch low-order portion 4). At this moment, the data selector 12 selects the update bus 11 to deliver data to the output data 13.

On the other hand, the input address 1 is loaded with an address n+2 (LSB=0) to read contents from the tag field a 6a and the valid flag field a 9a, which results in a hit. However, the data field 8 is under an update operation and hence is not available for a read operation. In consequence, the data read operation is postponed to be performed in the next cycle. As a result, the input address 1 is kept loaded with the address n+2.

C5 CYCLE

By using the address n+2, contents of the tag a 6a and the valid flag field a 9a are obtained, which results in a hit. Thereafter, the system reads data from the data field 8 at the address n+2 to send the data to the output data 13.

As described above, in accordance with this embodiment, by disposing two valid flag fields, the update for a miss and a judgement of a miss for the succeeding address can be simultaneously accomplished, thereby reducing the overhead at a miss occurrence.

FIG. 4 is a configuration diagram also showing the constitution of a cache memory of the fourth embodiment according to the present invention. The cache memory of the fourth embodiment is implemented by additionally disposing the following constituent components (indicated by the broken lines) in the third embodiment described above. Namely, the additional elements are an address latch 2 for storing therein the content of the input address 1 in the original data form, a tag selector a 19a for achieving a selection between the contents respectively of the input address 1 and the address latch 2 and for delivering the selected address to the tag field a 6a, and a data latch 21 for storing therein an output from the data field 8.

Subsequently, a description will be given of the operation of the embodiment thus constituted.

Figure 6:
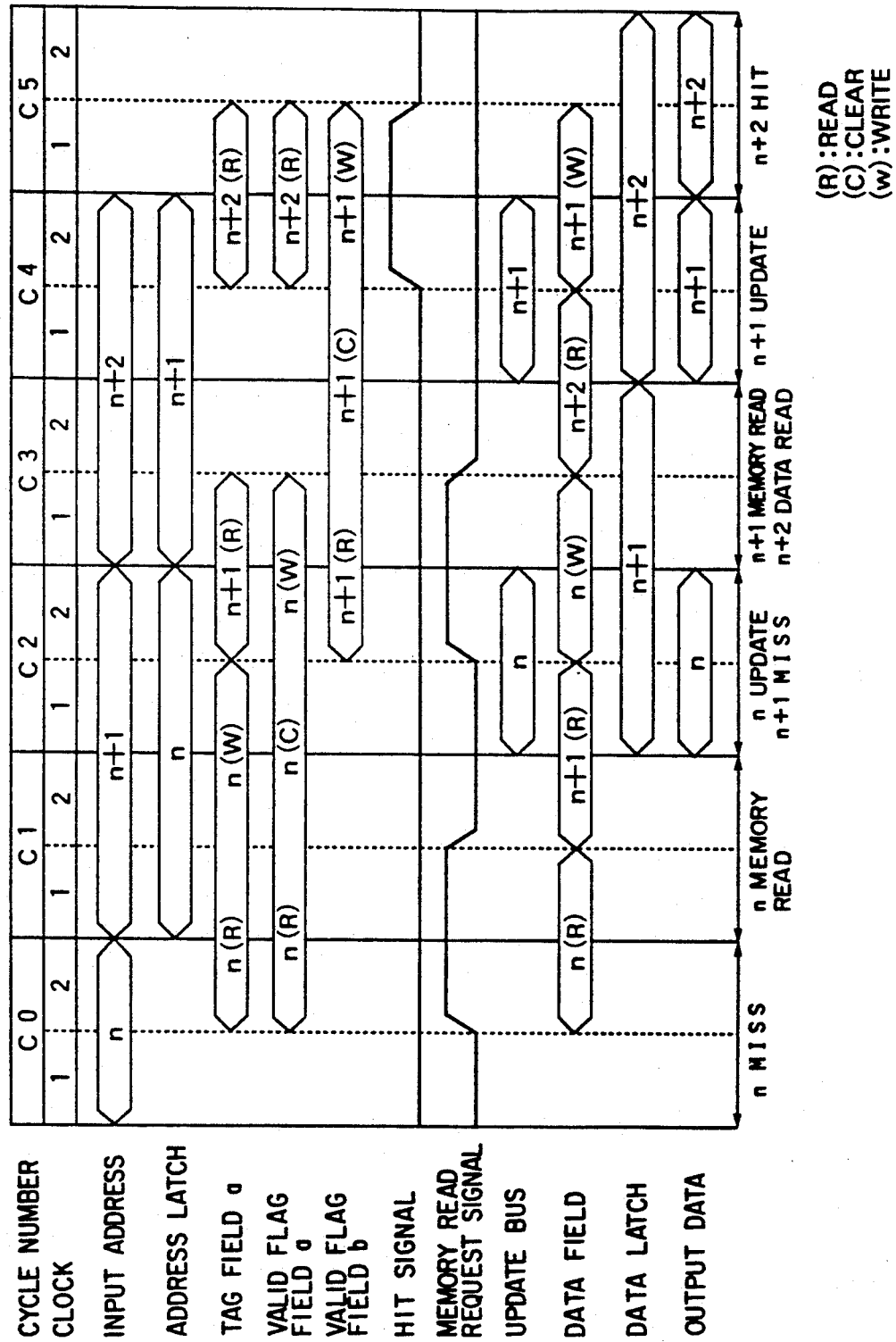
FIG. 6 is an operation timing chart of the cache memory of the fourth embodiment of the present invention.

FIG. 6 is a signal timing chart of the fourth embodiment. The operation will now be described in accordance with the operation sequence (in the cycle number order C0 to C5) of FIG. 6. Since the operation to be carried out at a miss occurrence is similar to that employed in the first embodiment, a detailed description thereof will be avoided.

C0 CYCLE

An address n (LSB=0) for a retrieval is supplied from the input address 1. Based on the low-order portion (entry address) of the input address 1, contents of the tag field a 6a and the valid flag field a 9a are read from the respective fields. As a result, a miss is detected in association with a mismatching between tags. The control means 18 creates a memory read request signal 16 to issue a memory read request to the memory.

C1 CYCLE

The memory transmits in response to the memory read request signal 16 a memory read acknowledge signal 17 to the control means 18, which then recognizes an initiation of the memory access (C1 is a memory read cycle). The system subsequently performs the following operations.

Update the tag data of the tag field a 6a for the entry address.

Clear a flag (all bits for the entry) in the valid flag field a 9a for the entry address.

The input address 1 is loaded with a next address n+1. At the same time, the address latch 2 keeps the content of the input address in the previous cycle.

The data field 8 is accessed for a read operation at the address n+1. The obtained data is stored in the data latch 21 in the subsequent cycle.

C2 CYCLE

The memory sends data onto the update bus 11 and then data is updated in the data field 8 for the entry address. At the same time, a flag (of one bit) is set in the valid flag field a 9a for the entry address. At this moment, the data selector 12 selects the update bus 11 to feed the data to the output data 13.

On the other hand, the tag field a 6a and the valid flag field a 9a are accessed for a read operation at the address n+1 (LSB=1), which results in a miss. In the cycle C2, although the tags match each other, the valid flag denotes invalidity, and hence the miss has occurred.

C3 CYCLE

C3 is a memory read cycle and thus performs the following operations.

Clear a flag (including one bit) in the valid flag field b 9b for the entry address.

The input address 1 is loaded with a next address n+2. At the same time, the address latch 2 keeps the content of the input address 1 in the previous cycle.

The data field 8 is accessed for a read operation at the address n+2. The obtained data is loaded in the data latch 21 in the subsequent cycle.

C4 CYCLE

The memory delivers data onto the update bus 11 and then data is updated in the data field 8 for the entry address. Simultaneously, a flag (of one bit) is set in the valid flag field a 9a for the entry address. At this moment, the data selector 12 selects the update bus 11 to feed the data to the output data 13.

On the other hand, the tag field a 6a and the valid flag field a 9a are accessed for a read operation at the address n+2 (LSB=0), which results in a hit.

C5 CYCLE

In response to the hit decision for the address n+2 in the preceding cycle, the content of the data latch 21 beforehand loaded with data obtained at the address n+2 is selected by the data selector 12. The selected data is immediately delivered to the output data 13.

In consequence, in the case of a hit taking place in the cache after a miss, the data is immediately sent to the output data 13 without any delay.

As described above, in accordance with this embodiment, with the provision of two valid flag fields, the update for a miss and a judgement of a miss for the next address can be simultaneously accomplished, thereby minimizing the overhead at a miss occurrence. Furthermore, since a data latch is disposed for an output from the data field so that, during a memory read cycle, data of the next address is attained and is kept in the data latch, which reduces the overhead of the hit operation after a miss occurrence.

Figure 7:
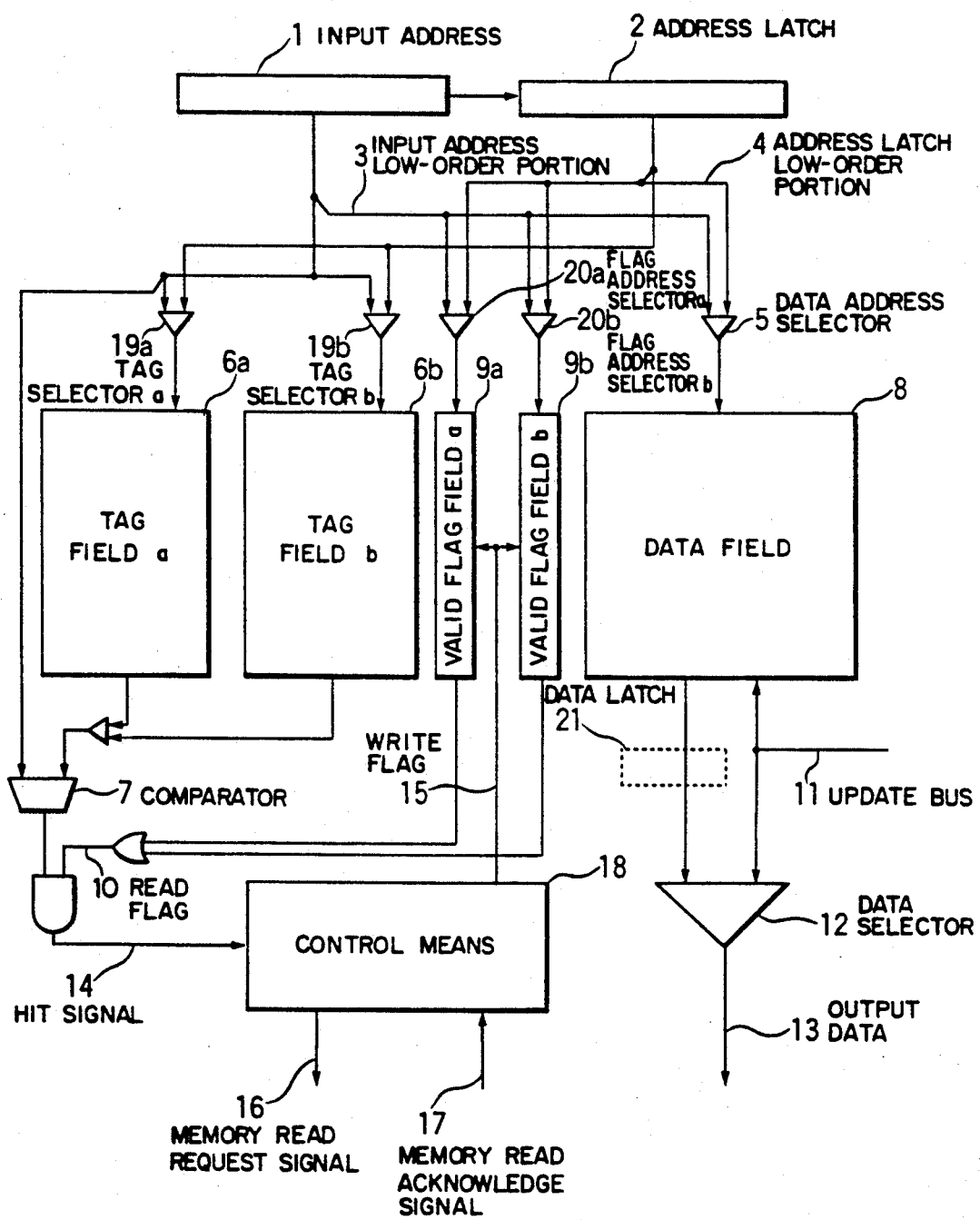
FIG. 7 is a schematic diagram showing the configuration of a cache memory according to fifth and sixth embodiments of the present invention.

FIG. 7 is a configuration diagram of a cache memory in a fifth embodiment according to the present invention. This configuration is an example of an instruction cache memory of a direct map system (four words assigned to each entry) used in an instruction fetch mechanism of a microprocessor. In the constitution of FIG. 7, there are shown an input address 1, an address latch 2 for storing therein a low-order portion of the input address, an input address low-order portion 3, an address latch low-order portion 4, a data address selector 5 for conducting selection between the input address low-order portion 3 and the address latch low-order portion 4, tag fields a 6a and b 6b, a comparator 7 for comparing a high-order portion of the input address 1 with an address attained from the tag field a 6a or b 6b, a data field 8, valid flag fields a 9a and b 9b each for storing therein a valid flag designating validity of data of the data field 8, flag address selectors a 20a and b 20b for respectively producing addresses for the valid flag fields a 9a and b 9b, a read flag 10, an update bus 11 for transferring therethrough update data of the data field 8, a data selector 12 for achieving a selection between data supplied from the data field 8 and data sent via the update bus 11, output data 13, a hit signal 14 created based on a signal from the comparator 7 and the read flag 10, a memory read request signal 16 delivered to a memory at a miss occurrence, a memory read acknowledge signal 17 sent from the memory in response to the memory read request signal, a write flag 15 for the valid flag field a 9a, control means 18 which outputs the memory read request signal 16 to the memory, receives the memory read acknowledge signal 17 from the memory, and generates a write flag 15 based on the lowermost portion of the input address 1, and tag selectors a 19a and b 19b for performing selection between the input address 1 and an output from the address latch 2 to send the selected address to the tag selector a 6a.

A description will now be given of the operation of the fifth embodiment configured as above.

In this embodiment, the system is constituted as follows. When the least significant bit (LSB) is 0 or 1, the tag field a 6a and the valid flag field b 6b are respectively accessed. The microprocessor is associated with a sequence of instructions consecutively arranged. That is, because of a characteristic of this system that the LSB of an address takes a value of 0 or 1 in an alternate manner, and hence the tag fields a 6a and b 6b as well as the valid flag fields a 9a and b 9b are alternately used, the embodiment operates in an advantageous fashion.

Figure 8:
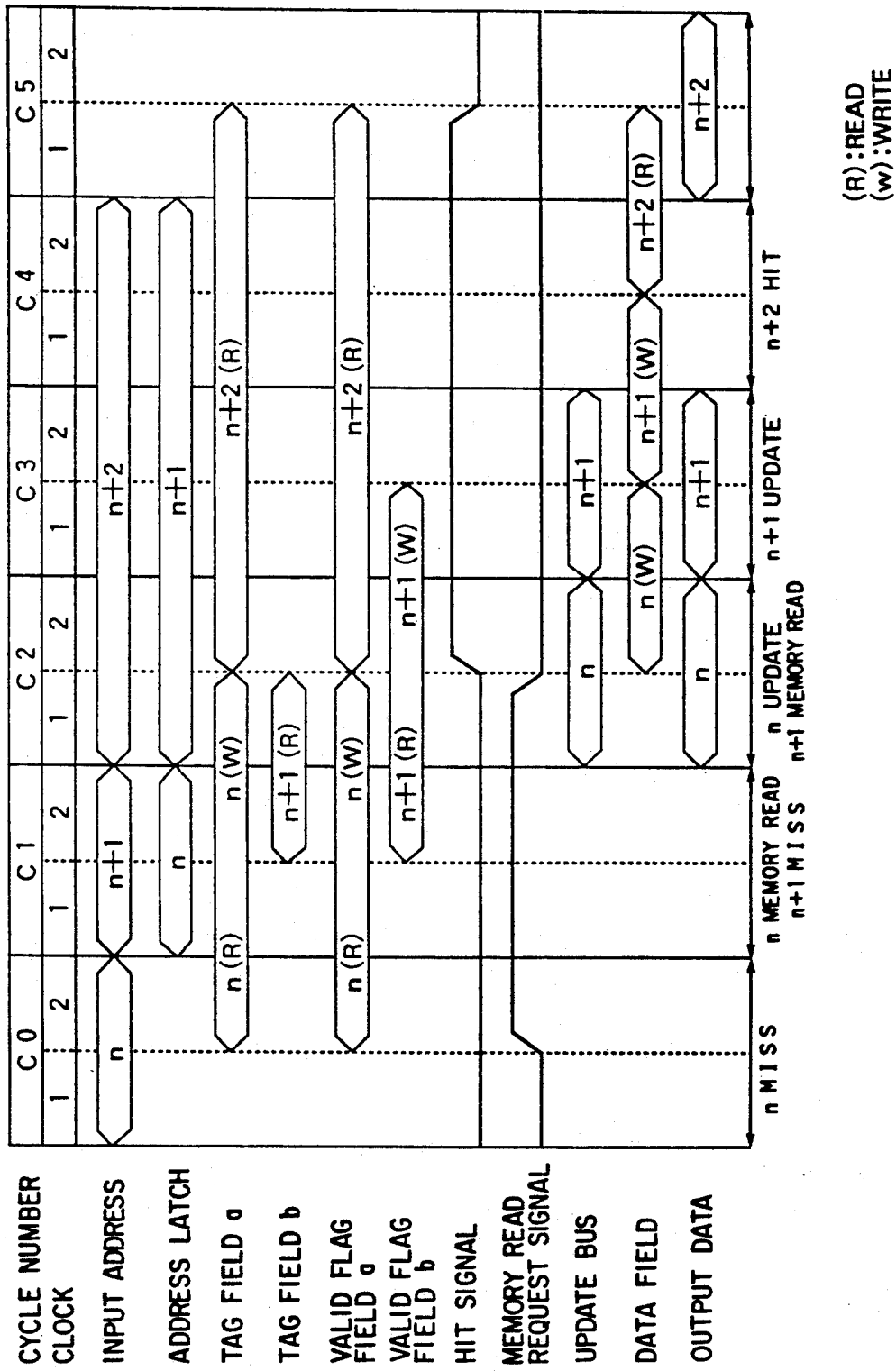
FIG. 8 is an operation timing chart of the cache memory of the fifth embodiment of the present invention.

Referring to FIG. 8 showing a signal timing chart of the embodiment, the operation will be described in the operation sequence (of the cycle numbers C0 to C5). In this regard, update means for the valid flag fields a 9a and b 9b are similar to the update means adopted in the first embodiment.

C0 CYCLE

An address n (LSB=0) for a retrieval is fed from the input address 1. In accordance with the low-order portion (an entry address) of the input address 1, contents of the tag field a 6a and the valid flag field a 9a are read from the respective fields. The comparator 7 compares the read address and the upper-portion (tag data) of the input address 1. In accordance with the result of the comparison by the comparator 7 and the read content of the valid flag field a 9a, a hit signal 14 is produced. In the C0 cycle, the tags do not match each other and hence a miss occurs. The control means 18 therefore generates a memory read request signal 16 to issue a read request to the memory.

C1 CYCLE

The memory returns a memory read acknowledge signal 17 to the control means 18, which in turn confirms that an access to the memory has started (C1 indicates a memory read cycle). The system then conducts the following operations.

Update of the tag field a 6a and the valid flag field a 9a (as to the address, the tag selector 19a and the flag address selector a 20a select the content of the address latch 2). address n+1. Simultaneously, the address latch 2 keeps the address n in the C0 cycle.

Contents of the tag field b 6b and the valid flag field b 9b are obtained by using the address n+1 (LSB=1). This results in a miss. In the C2 cycle, although the tags match each other, the valid flag indicates invalidity, and hence a miss occurs. The control means 18 generates a memory read request signal 16 and then issues a read request to the memory.

C2 CYCLE

The memory supplies data to the update bus 11 and then data of the data field 8 is updated based on the entry address (the address latch low-order portion 4 is selected by the data address selector 5). At this moment, the data selector 12 selects the update bus 11 to deliver data to the output data 13.

When the initiation of the memory access is confirmed (C2 is a memory read cycle), the following operations are conducted.

Update the valid flag field b 9b (as to the address, the flag address selector b 20b selects the content of the address latch 2).

Load the next address n+2 in the input address 1. Simultaneously, the address latch 2 keeps the address n+1 in the C2 cycle.

On the other hand, the system reads contents of the tag field a 6a and the valid flag field a 9a by using the address n+2 (LSB=0), thereby determining a hit. Since the data field 8 is under an update operation and hence cannot be accessed for a data read operation, the read operation is postponed to be performed in the next cycle. In consequence, the address n+2 is kept retained in the input address 1.

C3 CYCLE

The memory delivers data to the update bus 11 and then data of the data field 8 is updated based on the entry address (the address latch low-order portion 4 is selected by the data address selector 5). At this moment, the data selector 12 selects the update bus 11 to send data to the output data 13.

The system reads contents from the tag field a a and the valid flag field a 9a by using the address n+2, which results in a hit. Since the data field 8 is under an update operation and hence is unavailable for a data read operation, the read operation is postponed to be performed in the next cycle. Consequently, the address n+2 is kept retained in the input address 1.

C4 CYCLE

The system reads data from the tag field a 6a and the valid flag field a 9a at the address n+2. This results in a hit so a to read data from the data field 8 by using the address n+2.

C5 CYCLE

The data obtained from the data field 8 in the previous cycle is transmitted to the output data 13.

As described above, in accordance with this embodiment, owing to the provision of two tag fields and two valid flag fields, a memory read operation and a miss judgement on the subsequent address can be simultaneously accomplished, which resultantly reduces the overhead when a miss occurs in a successive fashion.

FIG. 7 is a configuration diagram also showing the constitution of a cache memory of the sixth embodiment according to the present invention. The cache memory of the sixth embodiment is implemented by additionally disposing a data latch 21 for storing therein an output from the data field 8 (indicated by the broken lines) in the fifth embodiment described above.

Subsequently, a description will be given of the operation of the embodiment thus constituted.

Figure 9:
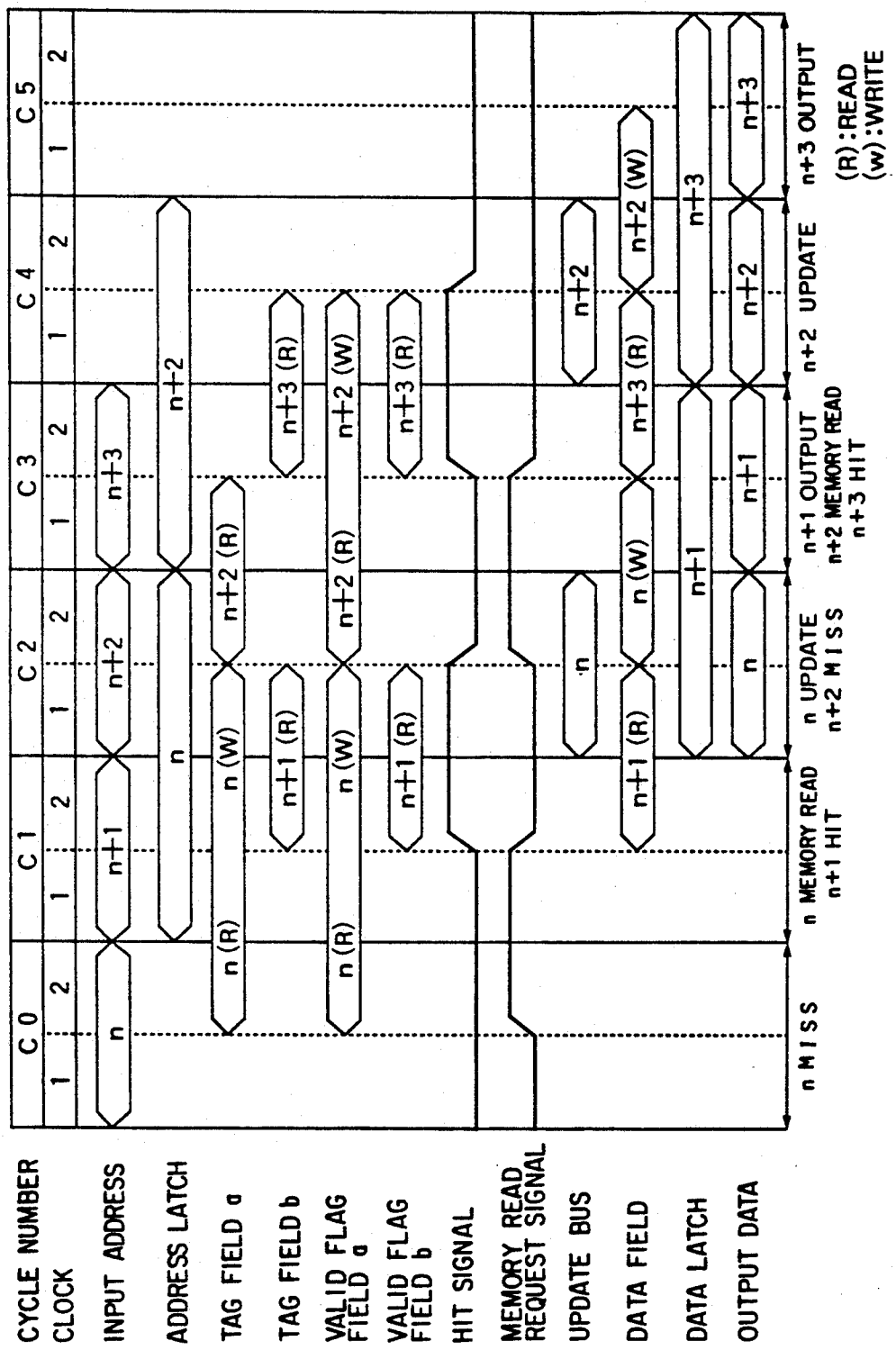
FIG. 9 is an operation timing chart of the cache memory of the sixth embodiment of the present invention.
Figure 10:
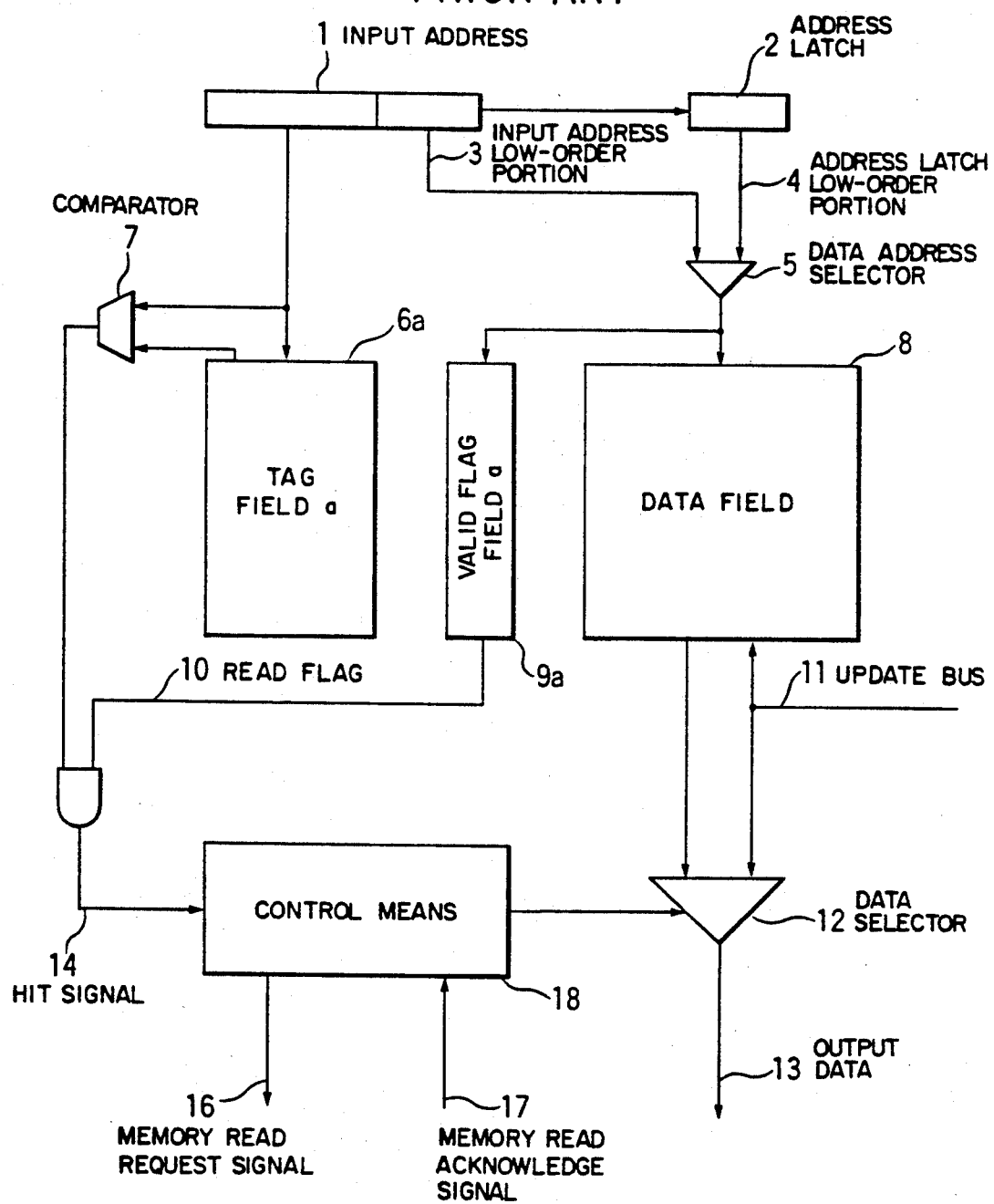
FIG. 10 is a configuration diagram showing a conventional cache memory.

FIG. 9 is a signal timing chart of the sixth embodiment. The operation of the embodiment will now be described in accordance with the operation sequence (in the cycle number order C0 to C5) of FIG. 9. Incidentally, update means for the tag fields a 6a and b 6b as well as the valid flag fields a 9a and b 9b are similar to those used in the fifth embodiment.

C0 CYCLE

An address n (LSB=0) for a retrieval is fed from the input address 1. Based on the low-order portion (entry address) of the input address 1, contents of the tag field a 6a and the valid flag field a 9a are read from the respective fields. Resultantly, a miss is detected in association with a mismatching between tags. The control means 18 produces a memory read request signal 16 to issue a memory read request to the memory.

C1 CYCLE

The memory sends in response to the memory read request signal 16 a memory read acknowledge signal 17 to the control means 18, which in return recognizes an initiation of the memory access (C1 is a memory read cycle). The system subsequently performs the following operations.

Update the tag data of the tag field a 6a for the entry address.

Clear a flag (all bits for the entry) in the valid flag field a 9a for the entry address.

Load the input address 1 with a next address n+1. At the same time, the address latch 2 keeps the content of the input address in the previous cycle.

On the other hand, for the address n+1 (LSB=1), the tag field b 6b, the valid flag field b 9b, and the data field 8 are accessed for a read operation. This results in a hit. The obtained data is stored in the data latch 21 in the subsequent cycle.

C2 CYCLE

The memory delivers data onto the update bus 11 and then data is updated in the data field 8 for the entry address. At this moment, the data selector 12 selects the update bus 11 to send the data to the output data 13.

On the other hand, for the address n+2 (LSB=0), the tag field a 6a and the valid flag field b 9b are accessed for a read operation, which results in a miss. In the cycle C2, although the tags match each other, the valid flag denotes invalidity, and hence the miss has occurred.

C3 CYCLE

In response to the hit decided for the address n+1 in the C1 cycle, the data selector 12 selects the content of the data latch 21 keeping data beforehand obtained at the address n+1. The obtained data is immediately delivered to the output data 13.

In the C3 cycle, which is a memory read cycle, the system performs the following operations.

Update a flag (including one bit) in the valid flag field a 9a for the entry address.

Load the input address 1 with a next address n+3. At the same time, the address latch 2 keeps the content of the input address 1 in the previous cycle.

On the other hand, the tag field b 6b, the valid flag field b 9b, and the data field 8 are accessed for a read operation at the address n+3(LSB=1). The obtained data is loaded in the data latch 21 in the next cycle.

C4 CYCLE

The memory sends data onto the update bus 11 and then data is updated in the data field 8 for the entry address. At this moment, the data selector 12 selects the update bus 11 to feed the data to the output data 13.

C5 CYCLE

In response to the hit decision for the address n+3 in the C3 cycle, the content of the data latch 21 beforehand loaded with data obtained at the address n+1 is selected by the data selector 12. The obtained data is immediately delivered to the output data 13.

In consequence, in the case of a hit occurring in the cache memory after a miss, the data is immediately sent to the output data 13 without any delay.

As described above, in accordance with this embodiment, by disposing two tag fields and two valid flag fields, a memory read operation and a judgement of a miss for the next address can be simultaneously accomplished, which minimizes the overhead when a miss occurs in a successive manner. Furthermore, since a data latch is disposed at an output from the data field so that, during a memory read cycle, data of the next address is obtained and is kept in the data latch, which reduces the overhead of the hit operation after a miss occurrence.

Incidentally, although the embodiments described above respectively include two tag fields and two valid flag fields, the number of each thereof is not limited to two. For example, when four tag fields and four valid flag fields are to be employed, two low-order bits of the address need only be assigned to select an objective tag and valid flag fields to be retrieved. Moreover, since the tag and valid flag fields are established only by subdividing the space there does not occur any increase in the area of these fields.

Furthermore, the embodiments adopt, as a mapping system, the direct map system; however, the embodiments may be simply configured in accordance with a set associative system or a full associative system.

As stated above, in accordance with the present invention, the following advantageous features are obtained.

(1) Without changing the configuration of the cache memory section, the update for a miss and the judgement or decision of a miss for the next address can be simultaneously attained, which hence reduces the overhead at a miss occurrence. In a method in which a write flag produced by the control means is written in the valid flag field, without altering the constitution of the cache memory section (including the tag, data, and valid flag fields), the update for a miss and the judgement of a miss for the next address can be simultaneously attained. Namely, with the area of the cache memory section kept retained, the operation speed of the cache memory can be increased.

(2) Without changing the configuration of the cache memory section, the feature (1) above can be obtained; furthermore, the overhead for a hit operation after a miss can be reduced. By adding a data latch to the means of (1), it is possible to beforehand store, during a read operation in a memory at another hierarchical level for a miss, data of the subsequent address in the data latch. In the case of a hit occurring after a miss, the data can be immediately supplied from the data latch. As a result, there is developed a more remarkable advantageous feature as compared with the case of (1).

(3) When different valid flag fields are used in a consecutive manner, by simultaneously performing the update for a miss and the judgement of a miss for the next address, the overhead at a miss occurrence can be minimized. When the configuration is adopted as an instruction cache, since the addresses are continuously assigned, an identical valid flag field is not successively used, which leads to an increase in the advantageous feature. In addition, any special hardware elements such as a two-port memory are not employed for the valid flag field. This field is constituted only by a single-port memory. Namely, as compared with the conventional system, the performance of this system is improved without increasing the hardware constituent components.

(4) When different valid flag fields are used in a consecutive manner, the advantageous feature (3) above can be obtained, and furthermore the overhead for a hit operation after a miss can be minimized. By adding a data latch to the means of (3), it is possible to beforehand store data of the subsequent address in the data latch. In the case of a hit occurring after a miss, the data can be immediately supplied from the data latch. As a result, the operation speed is further increased, which is a more remarkable advantage as (5) When different valid flag fields and different tag fields are used in a consecutive fashion, by simultaneously conducting memory reading for a miss and the judgement of a miss for the next address, misses occurring in a successive manner can be consecutively detected. When the configuration is adopted as an instruction cache, since the addresses are continuously assigned, neither an identical valid flag field nor an identical tag fields is successively used, which leads to an increase in the advantageous feature Moreover, in the case where misses occur successively, the advantageous effect is much more enhanced In addition, any special hardware elements such as a two-port memory are not employed for the valid flag and tag fields. Each of these field is constituted only by a single-port memory. That is, as compared with the conventional system, the performance of this system is improved without increasing the hardware constituent components.

(6) In the case where different valid flag fields and different tag fields are used in a consecutive manner, the advantageous feature of (5) above can be obtained, and furthermore the overhead for a hit operation after a miss can be minimized. By additionally disposing a data latch in the means of (5), it is possible to beforehand store data of the subsequent address in the data latch. In the case of a hit occurring after a miss, the data can be immediately supplied from the data latch. Namely, regardless of the miss and the hit, the data is consecutively supplied from the cache memory, which further contributes to an increase in the advantageous feature.

In short, in accordance with the present invention, without increasing the hardware constituent elements, the improvement of performance of the cache memory, which is most significant in increasing the operation speed of the microprocessor, can be attained, thereby considerably enhancing the practical advantageous effect.

While particular embodiments of the invention have been shown and described, it will be obvious to those skilled in the art that various changes and modifications may be made without departing from the present invention in its broader aspects.

We claim:

1. A cache memory comprising:
address latch means for storing an input address, the input address including tag data and a tag address;
tag field means for storing a plurality of tag data;
tag selector means, operatively coupled to said address latch means and said tag field means, for selectively receiving the input address and an output of said address latch means, and for outputting to said tag field means a tag address for accessing tag data from said tag field means;
comparing means, operatively coupled to said tag field means, for comparing tag data, read out of said tag field means in response to the tag address, with the tag address of the input address, said comparing means outputting a match signal when a match is obtained as a result of the comparison;
data field means for storing corresponding data for tag data in said tag field means;
data address selector means, operatively coupled to said address latch means and said data field means, for selectively receiving the input address and an output of said address latch means, and for outputting to said data field means an address for accessing the data from said data field means;
valid flag field means for storing a flag indicative of the validity of the data stored in said data field means corresponding to tag data in said tag field means;
flag address selector means, operatively coupled to said valid flag field means and said address latch means, for selectively receiving the input address and an output of said address latch means, and for outputting to said valid flag field means an address for accessing a flag from said valid flag field means;
hit decision indicating means, operatively coupled to said comparing means and said valid flag field means, for receiving the match signal output from said comparing means and a flag read out from said valid flag field means, and for deciding and indicating a cache hit/miss; and
data latch means, operatively coupled to said data field means, for storing data output from said data field means;
wherein, when a preceding cache access is decided to be a miss by said hit decision means, the contents of said tag field means and said valid flag field means corresponding to the miss of the preceding cache access are changed, and, while an access to an external memory is being made, said data address selector means selects the input address so that a subsequent cache access is made to said data field means and data thereby obtained is held in said data latch means, and, when a subsequent cache access is decided to be a hit by said hit decision means, the data held in said data latch means is output.

2. A cache memory comprising:
address latch means for storing an entry address of an input address;
tag field means for storing a plurality of tag data;
comparing means, operatively coupled to said address latch means and said tag field means for comparing tag data, read out from said tag field means on the basis of the entry address, with tag data of the input address, said comparing means outputting a match signal when a match is obtained as a result of the comparison;
data field means for storing corresponding data for each tag data in said tag field means;
data address selector means, operatively coupled to said address latch means and said data field means, for selectively receiving the input address and an output of said address latch means, and for outputting to said data field means an address for accessing the data from said data field means;
a plurality of separate valid flag field means, each being independently accessible, for storing a flag indicative of the validity of the data store in said data field means corresponding to tag data in said tag field means;

a plurality of flag address selector means, each operatively coupled to a respective valid flag field means and said address latch means, each for selectively receiving the input address and an output of said address latch means, and for outputting to a respective valid flag field means an address for accessing a respective flag from said valid flag field means; and hit decision indicating means, operatively coupled to said comparing means and said plurality of valid flag field means, for receiving the match signal output from said comparing means and a flag read out from one of said valid flag field means, and for deciding and indicating a cache hit/miss;

wherein, when updating of said data field means in response to an occurrence of a cache access miss, said data address selector means applies the entry address stored in said address latch means to said data field means to thereby perform updating of associated data stored in said data field means, and, at the same time, one of said flag address selector means applies the entry address stored in said address latch means to an associated first one of said valid flag field means to thereby set a flag in the associated first one of said valid flag field means, said flag corresponding to the associated data stored in said data field means, and, further at the same time, an access to the other one of said valid flag field means is made by selecting the input address, thereby to make a hit/miss decision on a subsequent cache access;

wherein said address latch means stored an input address including tag data and the entry address, and said cache memory further comprises:

tag selector means, operatively coupled to said address latch means and said tag field means, for selectively receiving the input address and an output of said address latch means, and for outputting to said tag field means an address for accessing tag data from said tag field means; and data latch means, operatively coupled to said data field means, for storing data output from said data field means; and wherein, when a preceding cache access is decided to be a miss by said hit decision means, the contents of said tag field means and the associated one of said valid flag field means corresponding to the miss of the preceding cache access are changed, and, while an access to an external memory is being made, said data address selector means selects the input address so that a subsequent cache access to said data field means are made and resultant data output from said data field means is held in said data latch means, and, when the subsequent cache access is decided to be a hit by said hit decision means, the resultant data held in said data latch means is output from said data latch means.

3. A cache memory comprising:

address latch means for storing an input address, said input address including tag data and a tag address;

a plurality of separate tag field means for storing a plurality of tag data, each of said plurality of divided tag field means being independently accessible;

a plurality of tag selector means, operatively coupled to respective tag field means and said address latch means, each for selectively receiving the input address and an output of said address latch means, and outputting to a corresponding one of the plurality of tag field means an address for addressing tag data from said corresponding one of said tag field means;

comparing means for comparing tag data read out from one of said tag field means on the basis of the tag address, with the tag data of the input address, and for outputting a match signal when a match is obtained as a result of the comparison;

data field means for storing corresponding data for each tag data in said tag field means;

data address selector means, operatively coupled to said data field means and said address latch means, for selectively receiving the input address and an output of sida address latch means, and for outputting to said data field means an address for accessing the data from said data field means;

a plurality of separate valid flag field means corresponding to said plurality of tag field means, each of said valid flag field means storing a flag indicative of the validity of the data stored in said data field means corresponding to tag data in a corresponding one of said tag field means;

a plurality of flag address selector means, each operatively coupled to said address latch means and a respective one of said valid flag field means, each receiving the input address and an output of said address latch means, and outputting to a corresponding one of said valid flag field means an address for accessing an associated flag from the corresponding one of said valid flag field means; and hit decision indicating means, operatively coupled to said comparing means and said plurality of valid flag field means, for receiving the match signal output from said comparing means and a valid flag read out from one of said valid flag field means, and for deciding and indicating a cache hit/miss;

wherein, when updating a first one of said tag field means, a first one of said valid flag field means, and said data field means in response to an occurrence of a cache access miss, the address stored in said address latch means is output from a first one of said tag selector means to an associated first one of said tag field means and from a first one of said flag address selector means to an associated firs tone of said valid flag field means, so that the associated first one of said tag field means performs updating of tag data, when necessary, and the associated first one of said valid flag field means sets a flag corresponding to data to be updated, and, at the same time, said data address selector means outputs the address stored in said address latch means to said data field means to thereby perform updating of the associated data stored in said data field means, and, further at the same time, an access to each of the other of said tag field means and the other of said valid flag field means is made by selecting the input address to thereby make a hit/miss decision on a subsequent cache access;

wherein said cache memory further comprises a data latch means for storing an output of said data field means, and wherein, when a preceding cache access is decided to be a miss by said hit decision means, the contents of the associated one of said tag field means and the associated one of said valid flag field means corresponding to the miss of the preceding cache access are changed, and, while an access to an external memory is being made, said data address selector means selects the input address so that a subsequent cache access to said data field means is made and resultant data output from said data field means is held in said data latch means, and, when the subsequent cache access is decided to be a hit by said hit decision means, the resultant data held in said data latch means is output from said data latch means.

* * * * *